United States Patent
Hales

(10) Patent No.: US 10,093,348 B2
(45) Date of Patent: Oct. 9, 2018

(54) ELECTRICAL POWER STEERING WITH TWO CONTROLLERS AND CLOSED-LOOP INTEGRAL ACTION

(71) Applicant: STEERING SOLUTIONS IP HOLDING CORPORATION, Saginaw, MI (US)

(72) Inventor: Michael K. Hales, Midland, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 0 days.

(21) Appl. No.: 15/621,163

(22) Filed: Jun. 13, 2017

(65) Prior Publication Data

US 2017/0361869 A1 Dec. 21, 2017

Related U.S. Application Data

(60) Provisional application No. 62/351,498, filed on Jun. 17, 2016.

(51) Int. Cl.
  *H02K 17/32* (2006.01)
  *H02K 23/68* (2006.01)
  (Continued)

(52) U.S. Cl.
  CPC .............. *B62D 5/0463* (2013.01); *H02P 5/00* (2013.01); *H02P 5/74* (2013.01)

(58) Field of Classification Search
  CPC ........ B62D 5/0463; B62D 5/044; H02P 5/002
  (Continued)

(56) References Cited

U.S. PATENT DOCUMENTS 4,882,586 A * 11/1989 Dolph .................. B62D 5/0493
                                                    341/124
5,635,807 A *  6/1997 Lautzenhiser ........... B25J 13/00
                                                    180/907

(Continued)

FOREIGN PATENT DOCUMENTS

DE       10114206 A1   11/2001
DE   102005062868 A1    7/2007

(Continued)

OTHER PUBLICATIONS

English Translation of German Office Action for German Application No. 102017113118.3 dated Mar. 28, 2018, 8 pages.

*Primary Examiner* — Erick Glass
(74) *Attorney, Agent, or Firm* — Cantor Colburn LLP

(57) ABSTRACT

Technical solutions are described for a motor control system, such as one used in a steering system, the motor control system including multiple controllers. In an example, the motor control system includes a first arbitration module associated with a first controller, and a second arbitration module associated with a second controller. The first arbitration module generates a first arbitrated input signal based on a first input signal directed to the first controller, and a second input signal directed to the second controller. The second arbitration module generates a second arbitrated input signal based on the first input signal and the second input signal. The first controller generates a first control output using the first arbitrated input signal, and the second controller generates a second control output using the second arbitrated input signal.

19 Claims, 7 Drawing Sheets

(51) Int. Cl.
*H02K 27/30* (2006.01)
*H02P 7/00* (2016.01)
*B62D 5/04* (2006.01)
*H02P 5/00* (2016.01)
*H02P 5/74* (2006.01)

(58) Field of Classification Search
USPC .......................................................... 318/433
See application file for complete search history.

(56) References Cited

U.S. PATENT DOCUMENTS

| | | | | |
|---|---|---|---|---|
| 6,014,000 A * | 1/2000 | Gutierrez | .................. | B41J 23/32 318/254.2 |
| 6,381,528 B1 * | 4/2002 | Kawada | .................. | B62D 5/0493 180/443 |
| 6,687,590 B2 * | 2/2004 | Kifuku | .................. | B62D 5/0463 180/443 |
| 7,019,486 B1 * | 3/2006 | Kifuku | .................. | H02M 1/32 318/767 |
| 7,154,244 B2 * | 12/2006 | Asaumi | .................. | B62D 5/046 318/599 |
| 8,084,972 B2 * | 12/2011 | Strong | .................. | H02P 6/14 318/400.01 |
| 8,548,681 B2 * | 10/2013 | Kushiro | .................. | B62D 6/007 137/625.23 |
| 8,650,440 B2 * | 2/2014 | Rohleder | .................. | G06F 11/10 712/43 |
| 8,751,710 B2 * | 6/2014 | Fowler | .................. | G06F 1/1684 710/2 |
| 9,231,465 B2 * | 1/2016 | Hara | .................. | B62D 5/0403 |
| 2002/0093298 A1 * | 7/2002 | Walter | .................. | B60T 7/042 318/34 |
| 2004/0148080 A1 * | 7/2004 | Ekmark | .................. | B62D 5/046 701/41 |
| 2006/0042858 A1 * | 3/2006 | Boyle | .................. | B62D 5/003 180/402 |
| 2012/0130674 A1 * | 5/2012 | Fisher | .................. | H02P 29/021 702/151 |
| 2015/0091481 A1 * | 4/2015 | Tago | .................. | H02P 6/002 318/400.2 |
| 2015/0375780 A1 * | 12/2015 | Chai | .................. | B62D 6/008 701/41 |
| 2016/0173020 A1 * | 6/2016 | Kanekawa | .................. | B62D 5/0484 318/400.06 |
| 2016/0315577 A1 * | 10/2016 | Suzuki | .................. | H02P 21/05 |

FOREIGN PATENT DOCUMENTS

EP       1456720 B1    11/2007
WO     03050624 A1     6/2003

* cited by examiner

ELECTRICAL POWER STEERING WITH TWO CONTROLLERS AND CLOSED-LOOP INTEGRAL ACTION

CROSS-REFERENCES TO RELATED APPLICATIONS

This patent application claims priority to U.S. Provisional Patent Application Ser. No. 62/351,498, filed Jun. 17, 2016, which is incorporated herein by reference in its entirety.

BACKGROUND

The present application generally relates to an electrical power steering (EPS) system and particularly to EPS systems with two controllers and closed-loop control that includes integral action.

Typically, for reliability, an EPS system may use two independent controllers for calculating redundant motor control commands. Each command in turn drives a motor on a common shaft, such as a dual/wound motor. While the intent is for each of the two controllers to calculate the same control command, differences in sensor readings and latency between controller operating times lead to differences in calculated commands. Further when performing closed-loop control (such as controlling a measured motor position to a commanded motor position), the two controllers may end up with different values on integrator states, leading to large control commands, and thus, inefficiencies.

SUMMARY

According to one or more embodiments, a motor control system includes a first controller and a second controller to provide torque to a shaft. The motor control system further includes a first arbitration module associated with a first controller, and a second arbitration module associated with a second controller. The first arbitration module generates a first arbitrated input signal based on a first input signal directed to the first controller, and a second input signal directed to the second controller. The second arbitration module generates a second arbitrated input signal based on the first input signal and the second input signal. The first controller generates a first control output using the first arbitrated input signal, and the second controller generates a second control output using the second arbitrated input signal.

According to one or more embodiments, a method for operating a motor control system that includes two or more controllers includes computing, by a first arbitration module associated with a first controller, a first arbitrated input signal based on a first input signal directed to the first controller, and a second input signal directed to a second controller. The method further includes generating, by the first controller, a first control output using the first arbitrated input signal. The method further includes computing, by a second arbitration module associated with the second controller, a second arbitrated input signal based on the first input signal directed to the first controller, and the second input signal directed to the second controller. The method further includes generating, by the second controller, a second control output using the second arbitrated input signal.

According to one or more embodiments, an electric power steering system includes a first motor that generates a first assist torque, and a second motor that generates a second assist torque. The electric power steering system further includes a first controller to generate a first control output for the first motor using a closed-loop control loop to generate the first assist torque. The electric power steering system further includes a second controller to generate a second control output for the second motor using a closed-loop control loop to generate the second assist torque. The electric power steering system further includes a first arbitration module associated with the first controller, the first arbitration module configured to generate a first arbitrated input signal based on a first input signal directed to the first controller, and a second input signal directed to the second controller, the first arbitrated input signal used by the first controller to generate the first control output. The electric power steering system further includes a second arbitration module associated with the second controller, the second arbitration module configured to generate a second arbitrated input signal based on the first input signal directed to the first controller, and the second input signal directed to the second controller, the second arbitrated input signal used by the second controller to generate a second control output.

These and other advantages and features will become more apparent from the following description taken in conjunction with the drawings.

BRIEF DESCRIPTION OF THE DRAWINGS

The subject matter which is regarded as the technical solutions is particularly pointed out and distinctly claimed in the claims at the conclusion of the specification. The foregoing and other features, and advantages of the technical solutions are apparent from the following detailed description taken in conjunction with the accompanying drawings in which:

DETAILED DESCRIPTION

Referring now to the Figures, the technical solutions will be described with reference to specific examples, without limiting same. The technical solutions described herein include an architecture and methods for optimizing performance of a motor control system with two controllers being used to perform closed-loop control, such as an electric power steering (EPS) system or any other motor control system.

Figure 1:
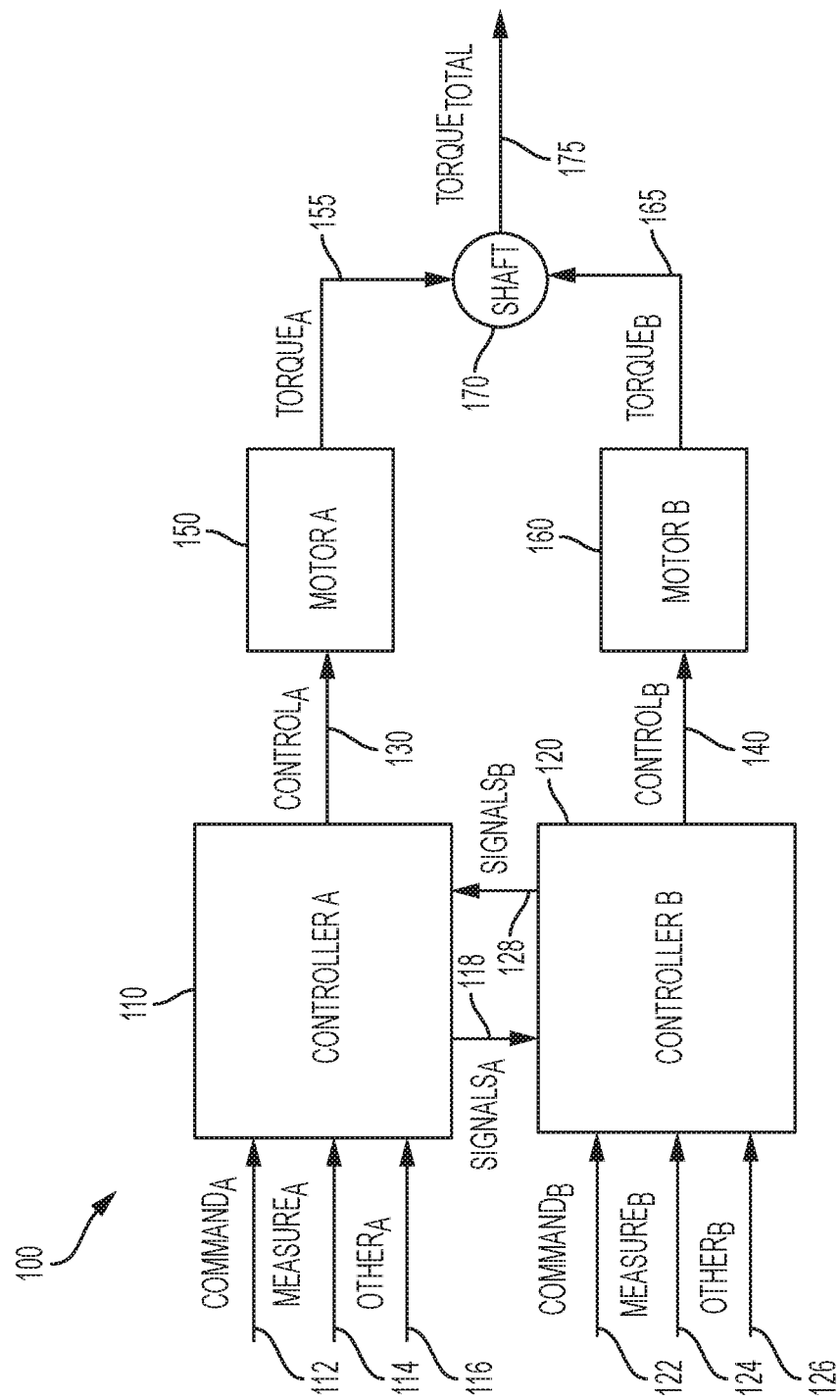
FIG. 1 illustrates an example layout of a motor control system in accordance with one or more examples.

FIG. 1 illustrates an example layout of a motor control system 100 with two controllers, according to one or more embodiments. It should be noted that although FIG. 1 and the other examples described herein use two controllers, the technical solutions described herein are applicable in other embodiments with more than two controllers. The controllers may be process controllers like proportional, integrating, derivative (PID) controllers, PI controllers, microprocessors, or any other processing units that have an integral state.

The motor control system 100 may be part of a system such as an EPS system, or any other system that includes two controllers independently performing a closed-loop process control, such as pumps, heaters, and the like. The technical solutions herein are described using examples of a two-motor system, such as an EPS system with two motors to provide assist torque. However, the technical solutions described herein are applicable in other applications where two independent controllers are used for continually measuring process variables such as temperature, pressure, level, flow and concentration—and taking actions such as opening valves, slowing down pumps and turning up heaters—so that the measured process variables are maintained at specified set point values, such as predetermined values or operator provided input values. In one or more examples, the two controllers may be used to provide redundancy.

Referring to FIG. 1, a controller-A 110 runs independently of a controller-B 120. Command-A 112 is a signal that is received from an external system to have the motor control system 100 control to perform an operation. For example, in case of the EPS system, the external system may be a vehicle controller unit that may request a commanded motor position, motor velocity, torque, or the like. A redundant and independent version of the command is also sent to the controller-B 120, labeled command-B 122 in FIG. 1. To perform the closed-loop control, the controller-A 110 receives a measurement corresponding to the command-A 112, referred to as measure-A 114. Independently, for performing a closed-loop control, the controller-B 120 receives a redundant and independent measurement, referred to as measure-B 124. Additional redundant and independent signals that affect system behavior are also identified as being sent to both controllers as part of the other-A 116 and other-B 126.

In one or more examples, the command-A 112 and the command-B 112, while intended to be the same, may be different. For example, the command-A 112 is to control the motor-A 150 shaft angle to 10 degrees and the command-B 122 is to control the motor-B 160 shaft angle to 12 degrees. Alternatively, or in addition, the measure-A 114 and the measure-B 124 may have different values from each other. For example, the measure-A 114 may be a motor angle, or any other measurement that is measured by a first sensor, while the measure-B 124 may be the motor angle (or any other measurement) that is measured by a second sensor. The two sensors used for the measurements can have non-trivial differences, for example because of production errors, age of sensors, or any other such reason that cause the values of the measure-A 114 and the measure-B 124 to be different. In another example, a single sensor captures the values for the measure-A 114 and the measure-B 124, but at different time-points. For example, the measure-A 114 is captured at time T1 and the measure-B is captured at time T2 (or vice-versa). Capturing the measurements at the different times introduces non-trivial differences in the measured values. It should be noted that in other examples, the commands and measurements may be different than those listed in the examples herein.

In one or more examples, the controller-A 110 generates an output control command-A 130 and the controller-B 120 generates an output control command-B 140 based on the respective input signals. Consider the case of the EPS system where, the controller-A 110 provides the control command-A 130 to a motor-A 150 and the controller-B 120 provides the control command-B 140 to a motor-B 160. A resulting output torque-A 155 from the motor-A and a resulting output torque-B 165 from the motor-B operate a shaft 170. For example, the shaft 170 may be a steering shaft that connects a handwheel of an EPS system with a rack or wheels of a vehicle, the output torques providing assistance torque to the operator of the EPS system. The assist torque facilitates an operator of a vehicle equipped with the EPS system to maneuver the vehicle. The total torque 175 applied to the shaft 170 is the sum of the output torque-A 155 and the torque-B 165.

It is assumed that the input signals sent to the controller-A 110 and the controller-B 120 respectively have substantially the same value, resulting in substantially similar outputs from the two controllers, resulting in a balanced control of the assist torque generated by the EPS system. However, it can be appreciated that there are non-trivial differences between the input signals sent to the two controllers, and/or non-trivial processing time differences between the two controllers. The differences lead to imbalanced output from the two controllers. The technical solutions herein address the technical challenges caused by the non-trivial differences between the two sets of input signals and/or processing times of the two controllers. The type of differences in the signals that are the subject of the technical solutions herein are either constant or slowly changing over time with respect to the controller operating rate.

For example, to compensate for constant or slowly changing differences between like signals, in one or more examples, the technical solutions facilitate sharing the input signals between the two controllers, the controller-A 110 and the controller-B 120. Further, in one or more examples, the controllers arbitrate the two input signals received by the respective controllers. Alternatively, the input signals are arbitrated prior to inputting the signals into the controllers. Referring to FIG. 1, signals-A 118 depicts a collection of signals sent from the controller-A 110 to the controller-B 120. In one or more examples, the signals-A 118 includes the signals command-A 112, measure-A 114, and other-A 116, along with any other internally calculated values that the controller-A 110 shares with the controller-B 120. Similarly, signals-B 128 is a collection of signals sent from the controller-B 120 to the controller-A 110. In one or more examples, the signals-B 128 includes the signals command-B 122, measure-B 124, and other-B 126, along with any other internally calculated values that the controller-B 120 shares with the controller-A 110.

Figure 2:
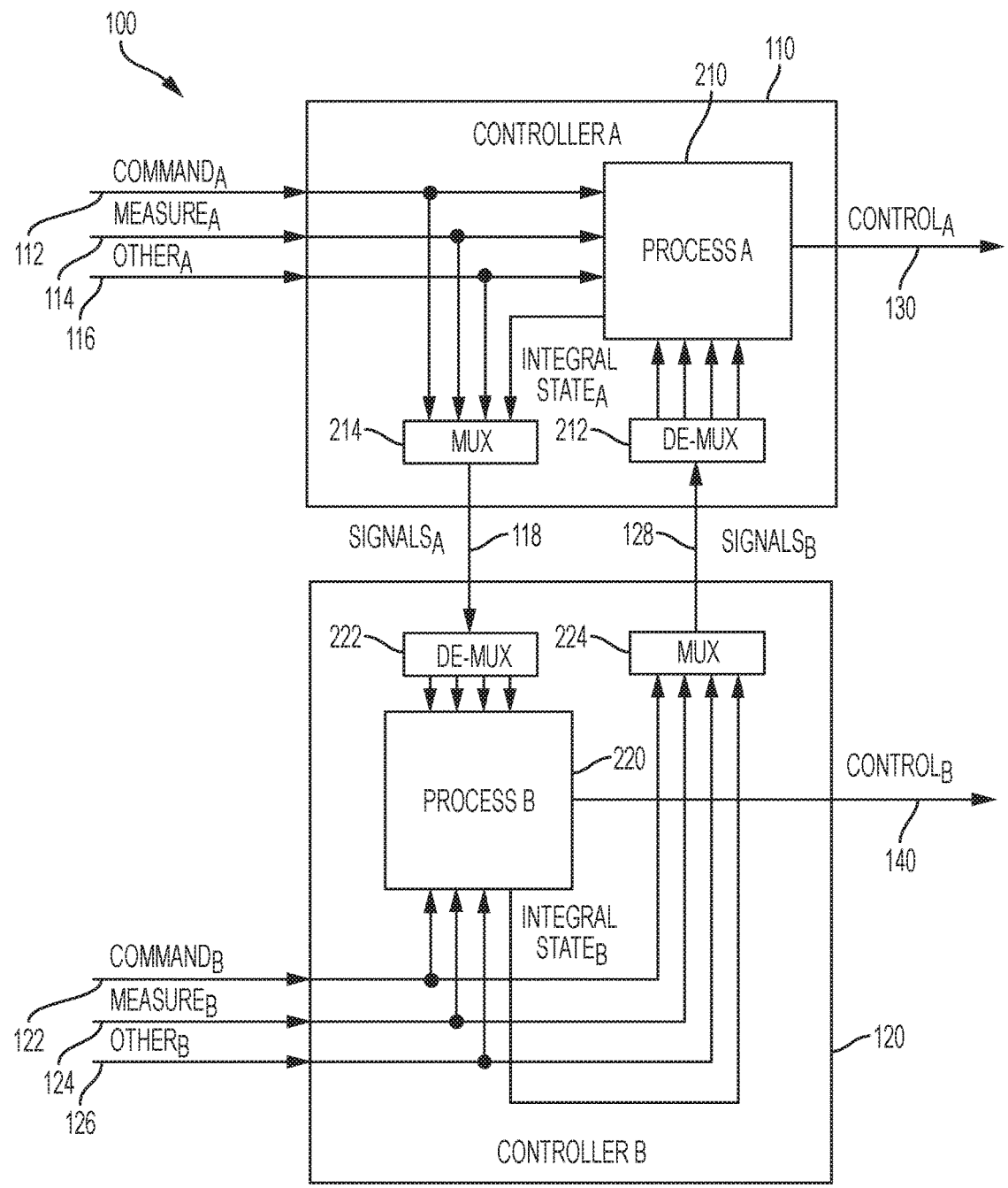
FIG. 2 illustrates another example layout of a motor control system with two controllers in accordance with one or more examples.

FIG. 2 depicts an example block diagram for sharing signals between the two controllers according to one or more embodiments. The controller-A 110 includes a demultiplexer (demux) 212 that receives the collection of shared signals-B 128 from the controller-B 120. The shared signals-B 128 are multiplexed by a multiplexer 224 of the controller-B 120. The demultiplexer 212 separates the multiplexed shared signals-B 128 from the controller-B 120 into the separate components, such as the command-B, measure-B, integral state-B, and so on. In a similar manner, the controller-A 110 includes a multiplexer 214 that multiplexes the input signals received by the controller-A 110, and the integral state-A of the controller-A 110 into the collection of shared signals-A 118. The multiplexed shared signals-A 118 are then sent to a demultiplexer 222 of the controller-B 120 that separates and uses the components of the shared signals-A 118. It should be noted that the shared signals may include fewer, additional, and/or different signals that are multiplexed than those listed in the above example.

FIG. 2 further depicts a process-A 210 and a process-B 220 that are executed by the controller-A 110 and the controller-B 120 respectively. The two processes depicted include a closed-loop control operation performed by each of the respective controllers. For example, the process-A 210 controls a system, such as an EPS, so that the output follows a reference control signal, which may be a fixed or changing value and modifies the behavior of the system based on the input signals. For example, in case of the EPS, the controller-A 110 modifies the position of the shaft 170 according to a reference control signal based on the command-A 112 and the measure-A 114. In a similar manner, the controller-B 120 executes the process-B 220 to control the position of the shaft according to the command-B 112 and the measure-B 114. In one or more examples, the other-A 116 and the other-B 126 may include feedback/feed-forward signals that the controllers receive and use for the closed-loop control. In one or more examples, the process-A 210 and the process-B 220 include performing the arbitration of the input signals. Alternatively, the processes receive the arbitrated signals.

It should be noted that other in other examples the signals between the controllers are shared in a different manner than in FIG. 2. For example, in one or more embodiments, the input signals to the controller-A 110 are also sent directly to the controller-B 120 and the input signals directed to the controller-B 120 are also sent to the controller-A 110.

In another example layout of the motor control system 100, the two controllers receive two sets of input signals that are directly sent to the two controllers. In this layout, the controller-A 110 receives the command-A 112, the measure-A 114, and the other-A 116 signals, and in addition, directly receives the command-B 122, the measure-B 124, and the other-B 126 signals as inputs. The signals listed above are input directly into the controller-A 110 from the external system, measurement sensors, and other devices, in addition to the signals-B 128 signals shared by the controller-B 120. In a similar manner, the controller-B 120 receives the command-A 112, the measure-A 114, and the other-A 116 signals directly as input, in addition to the command-B 122, the measure-B 124, and the other-B 126 signals. Further, the controller-A 110 shares the signals-A 118 with the controller-B 120.

In one or more examples, the set of signals that is shared between the controllers, (signals-A 118 and the signals-B 128) do not include the input signals that are directly sent to the controllers, and rather only include one or more values computed by one of the controllers that is to be shared with the other controller. For example, the signals-A 118 only includes an internally computed value by the controller-A 110 that is to be shared with the controller-B 120, and not the command-A 112 that is already directly sent to the controller-B 120. Similarly, in one or more examples, signals-B 128 only includes an internally computed value by the controller-B 120 that is to be shared with the controller-A 110, and not the measure-B 122 that is already directly sent to the controller-A 110. Other combinations are possible in other examples.

Figure 3:
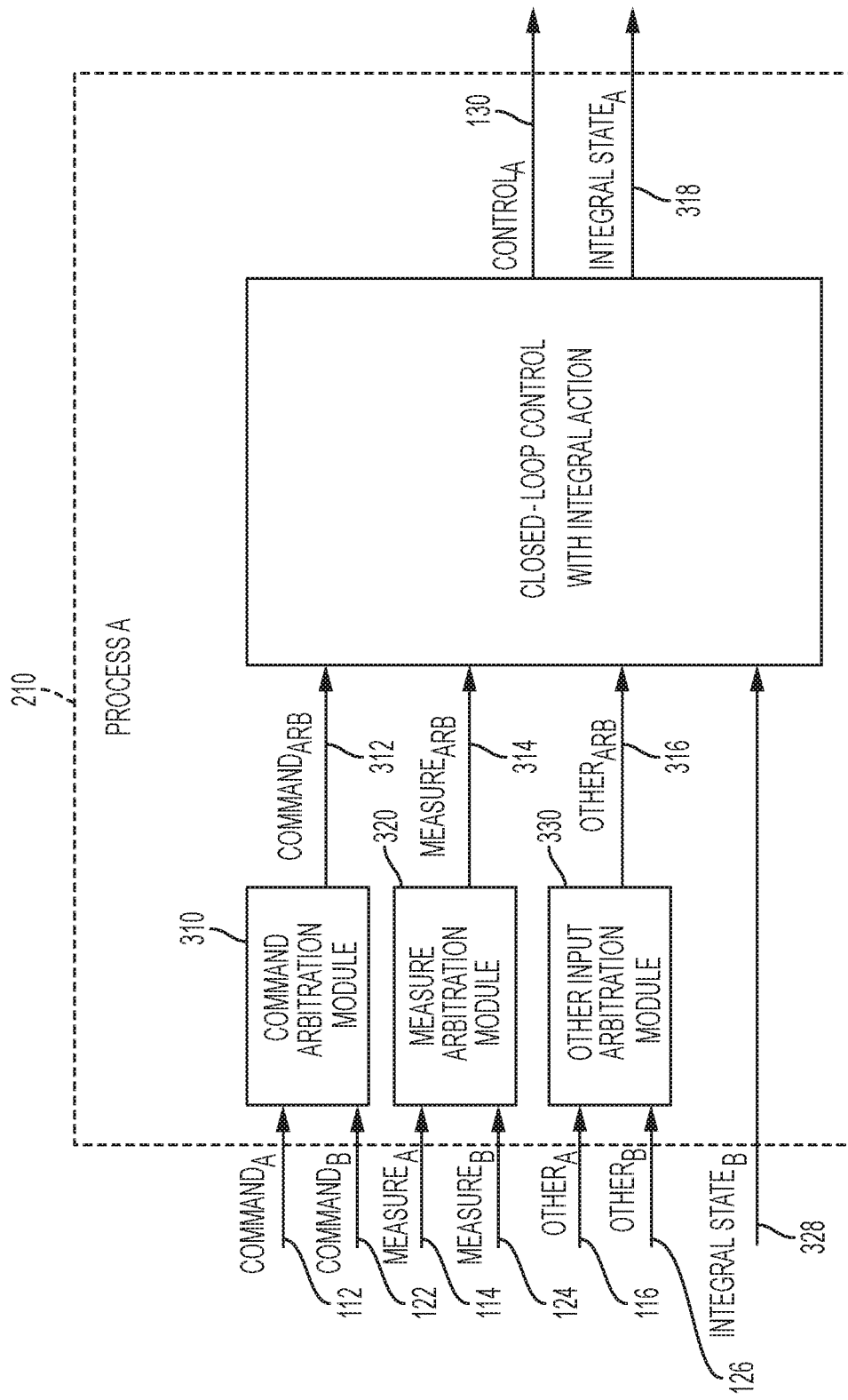
FIG. 3 shows an example block diagram for arbitrating input signals of multiple controllers in accordance with one or more examples.

FIG. 3 shows an example block diagram for arbitrating the input signals of multiple controllers according to one or more embodiments. For simplicity, FIG. 3 depicts arbitrated signals in the context of the process-A 210 that is being executed on the controller-A 110 only; however, a similar arbitration is performed for the input signals of the process-B 220 on the controller-B 120. Further, in the example illustrated, the controller-A 110 (and the controller-B 120) is a controller that includes integral action (PI, or PID controller), which is used in a closed-loop control logic of the motor control system 100. For example, the controller may be used for performing a position control operation of an EPS system, the controller-A 110 (and the controller-B 120) being a regulator that has integral action.

Referring to FIG. 3, the input signals used to perform the closed-loop control with integral action are arbitrated signals, command-Arb 312, measure-Arb 314, and other-Arb 316. The arbitrated signals are computed by corresponding arbitration modules, a command arbitration module 310, a measure arbitration module 320, and any other input arbitration module 330. It should be noted that although FIG. 3 depicts separate arbitration modules for different input signals, in one or more examples, a single arbitration module may arbitrate the different input signals.

The command arbitration module 310 arbitrates the signal command-A 112, which is directly sent to the controller-A 110, with the command-B 122, which was first directly sent to the controller-B 120. In one or more examples, the command-B 122 is received by the command arbitration module 310 from the controller-B as part of the shared signals-B 128 (FIG. 1). Alternatively, or in addition, in other examples, the command arbitration module 310 receives the command-B 122 directly in addition to the command-A 112.

The measure arbitration module 320 arbitrates the signal measure-A 114, which is directly sent to the controller-A 110, with the measure-B 124, which was first directly sent to the controller-B 120. In one or more examples, the measure-B 124 is received by the measure arbitration module 320 from the controller-B as part of the shared signals-B 128 (FIG. 1). Alternatively, or in addition, in other examples, the measure arbitration module 320 receives the measure-B 124 directly in addition to the measure-A 114.

In a similar manner, the other input arbitration module 330 arbitrates the signal other-A 116, which is directly sent to the controller-A 110, with the other-B 126, which was first directly sent to the controller-B 120. In one or more examples, the other-B 126 is received by the other input arbitration module 330 from the controller-B as part of the shared signals-B 128 (FIG. 1). Alternatively, or in addition, in other examples, the other arbitration module 330 receives the other-B 126 directly in addition to the other-A 116. It should be noted that the other signals (Other-A 116 and other-B 126) can include any other parameters that the respective controllers receive to perform the commanded operation, for example look-up table access values, predetermined thresholds, or any other such data.

The controller-A 110 further receives an integral state-B 328 from the controller-B 120 as an input signal. The integral state-B 328 is an intermediate value that the controller-B 120 uses for computing the control-B 140 output. In a similar manner, the controller-B 120 receives an integral state-A 318 that the controller-A 110 computes and uses for computing the control-A 130 output. In one or more examples, the integral state is sent by one controller to the other as part of the shared signals, shared-A 118 and/or shared-B 128.

Figure 4:
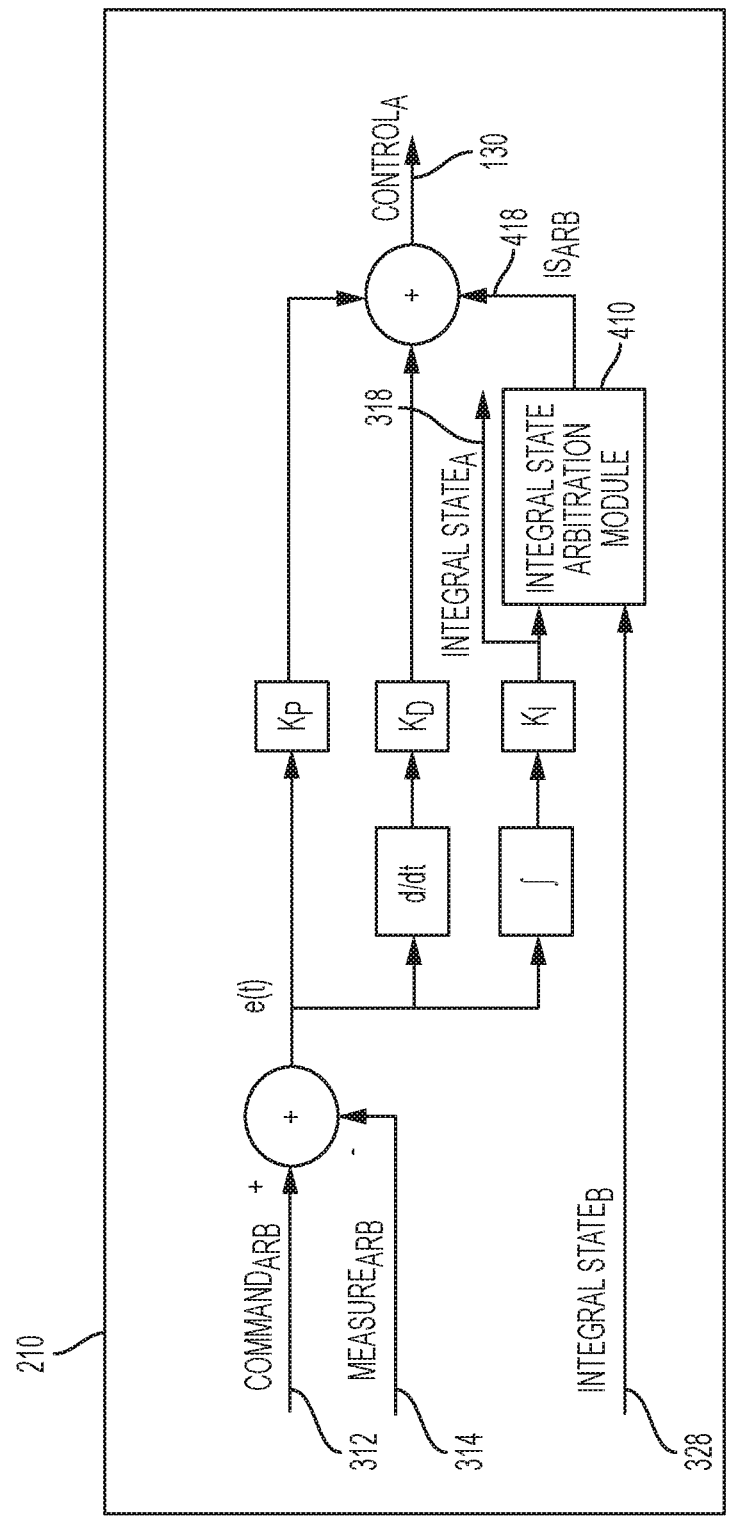
FIG. 4 depicts a dataflow for an example controller with an integral state in accordance with one or more examples.

FIG. 4 depicts a dataflow for an example PID controller according to one or more embodiments. Although the FIG. 4 displays the dataflow for the controller-A 110, the controller-B 120 operates similarly. Typically, a PID controller operates according to the following expression.

$$CO = K_p \cdot e(t) + \frac{K_i}{T_i} \int e(t)dt + K_d \cdot \frac{de}{dt} \qquad \text{Equation (1)}$$

where, CO is the controller-A output; e(t) is current controller error, defined as SP—PV; SP is a set point, in this case the command-Arb 112; PV is the measured process variable, in this case the measure-Arb 114; Kp is a controller gain (also called proportional gain), which is a tuning parameter; Ki is an integral gain, a tuning parameter; and Kd is a derivative gain, a tuning parameter; and Ti is reset time, a tuning parameter. In one or more examples, the controller may also add a controller bias term ($CO_{bias}$), which is a predetermined value, for example set by bumpless transfer. Further, in one or more examples, the controller may provide other tuning parameters than those in the above example equation (1), for example a derivative time (Td) a tuning parameter. The tuning parameters may be predetermined values and/or configurable values that are tuned during runtime. The integral state-A 318 of the controller-A 110 in this equation is the term represented by $$\frac{K_i}{T_i} \int e(t)dt.$$

The integral state-B 328 of the controller-B 120 is also represented by that term using values for the controller-B 120. It should be further noted that the integral state-A 318 is provided to the controller-B 120 as input, as shown in FIG. 2.

Referring to FIG. 4, the controller-A 110 arbitrates the integral state-A 318 that the controller-A 110 computes with the integral state-B 328 that the controller-A 110 receives from the controller-B 120. In one or more examples, the controller-A 110 uses an integral state arbitration module 410 to perform the arbitration between the two integral states. Thus, the equation for the controllers can be expressed as $$CO = K_p \cdot e(t) + IS_{Arb} + K_d \frac{de}{dt} \quad \text{Equation (2)}$$

where, $IS_{Arb}$ is the arbitrated integral state. For example, for the controller-A 110, the $IS_{Arb}$ is the arbitrated integral state 418 that is computed based on the integral state-A 318 and the integral state-B 328. In case of the controller-B 120, the $IS_{Arb}$ is also an arbitrated integral state that is computed based on the integral state-A 318 and the integral state-B 328. The integral state arbitration module 410 thus facilitates the two controllers to use a common arbitrated integral state when determining the respective outputs. Further, in case of the controller-B 120 the input signals are arbitrated with the signals from the controller-A 110 in a similar manner as described above, to facilitate the two controllers to compute substantially similar outputs respectively.

It should be noted that although the above example uses a PID controller, in other embodiments a PI controller, or any other controller with an integral state may be used by the technical solutions.

The integral state arbitration module 410 facilitates the arbitration between the integral states of the two controllers, which prevents integrator windup between the integral states. The integral state arbitration module 410 uses different methods to arbitrate the signals from the two controllers, such as pass-through, average, weighted average, among others. The arbitration facilitates taking two signals that are supposed to be the same, however have non-trivial differences that make the signals similar but not exactly the same, and generating a common value to be used by both the controllers. Although, an option may be to use the same signal in both controllers, for example, in FIGS. 1 and 2 the controller-A 110 and the controller-B 120 both receive the same command-A 112 (and command-B 122 does not exist). Alternatively or in addition, an average of respective input signals is used as a common signal. For example, the command arbitration module 310 generates the command-Arb (FIG. 3) based on the following equation:

$$\text{Command } ARB = \frac{CommandA + CommandB}{2} \quad \text{Equation (3)}$$

Technical challenges exist with the preceding examples, such as when computing an arbitrated signal by averaging the two input signals, a lag is introduced into the arbitrated signal because the two controllers do not execute the logic at the same time. Further, communicating signals from one controller to the other also takes time and introduces a lag. Such lags reduce the effectiveness of the closed-loop control scheme, and thus it is desirable to minimize such lags. Increasing the rate of signal transmission from one controller to the other reduces the lag, but at the cost of more expensive communication protocols and the need for faster controller speeds. Without addressing such technical challenges, integral action on the multiple controllers leads to integrator windup. The technical solutions described herein address such technical challenges.

Figure 5:
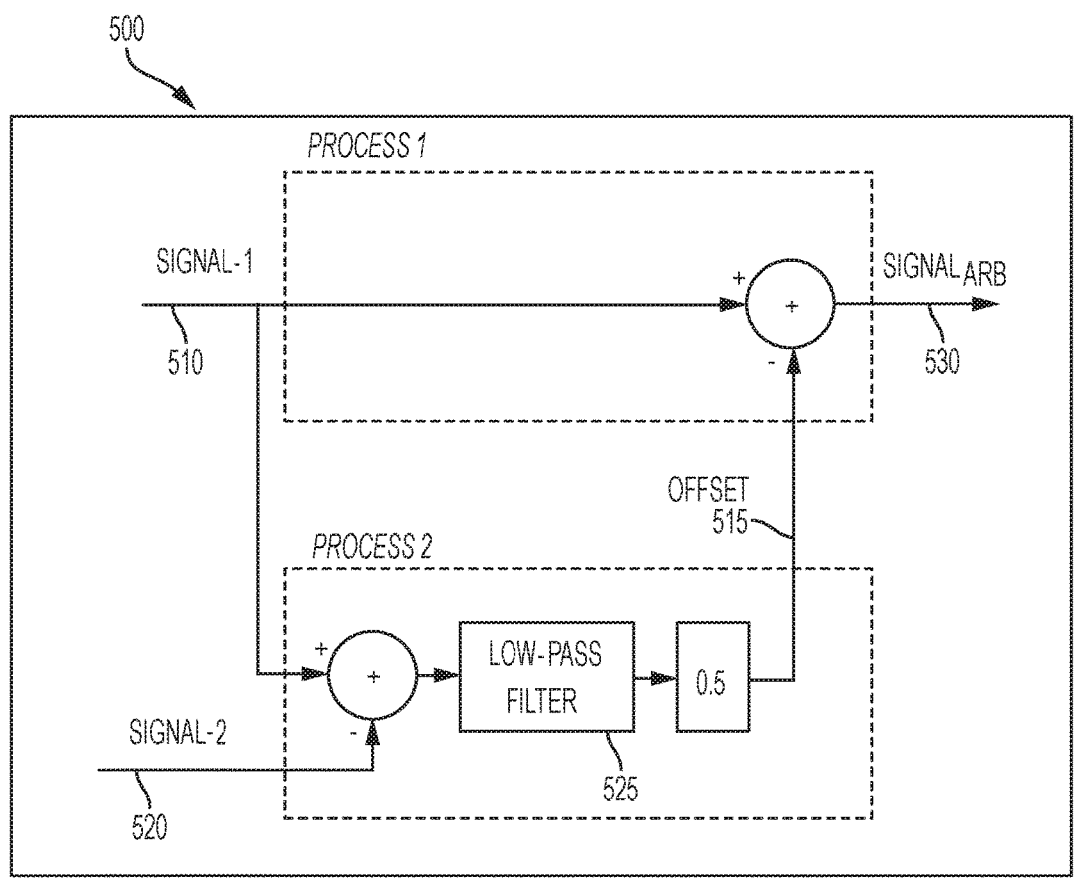
FIG. 5 illustrates a dataflow for an example arbitration module for arbitrating two signals in accordance with one or more examples.

FIG. 5 illustrates a dataflow for an example arbitration module 500 for arbitrating two signals according to one or more embodiments. The arbitrating scheme provided by the technical solutions described herein minimizes a lag that may be introduced into the arbitrated signal without requiring high signal transmission rates between the controllers. The arbitration module 500 depicted by FIG. 5 may be any one of the arbitration modules used by the two controllers, such as the command arbitration module 310, the measure arbitration module 320, the other input arbitration module 330, and the integral state arbitration module 410. The arbitration module 500 receives, as input, a first signal 510 and a second signal 520, and generates a signal-Arb 530 as output arbitrated signal. The input signals may be any of the signals that are arbitrated in the examples described herein, such as the command signals, the measure signals, the other input signals, and the integrated state signals.

In the depicted example of FIG. 5, it is assumed that the arbitrated signal signal-Arb 530 is being used to replace the first signal 510 for a process-1, and that the second signal 520 is an input/computed signal from a process-2. For example, consider that the process-1 is the closed loop control performed by the controller-A 110, and the process-2 is the closed loop control performed by the controller-B 120. In such a case, the first signal 510 is any one of the input signals that are provided to the controller-A 110, and the second signal 520 is a corresponding signal from the controller-B 120. Additionally, similar arbitration is performed at the input of the process-2, that is the controller-B 120, where the first signal 510 and the second signal 520 are reversed in comparison to the above example.

Referring back to FIG. 5, the arbitration module 500 subtracts a calculated offset 515 of the difference between the first signal 510 and the second signal 520 from the first signal 510. As the offset 515 is either constant or slow moving, such as 1 Hz or slower, the calculation of the offset 515 can occur at a commensurate slow rate, such as 10 Hz or faster. Here, 'slow moving' is indicative of a frequency at or below a predetermined threshold such as the 1 Hz example, however, it should be noted that the predetermined threshold may be different in different examples.

The arbitration module 500 further includes a low-pass filter 525 to ensure that only constant or slow-moving signal differences are used in the calculation of the offset 515, thus enabling the offset calculation to be at the slow rate. The low pass filter 525 filters the differences between the first signal 510 and the second signal 520, so that only if the rate of change of the difference is (at or) below the predetermined frequency, the offset 515 is calculated. In one or more examples, if the difference is above the predetermined threshold, the low pass filter 525 passes a value less than the difference that approaches zero as the frequency increases. The low pass filter 525 thus facilitates that a lag or latency between the first signal 510 and the arbitration signal 530 is minimized when correcting for an offset between signal 510 and signal 520.

In one or more examples, the low pass filter 525 outputs a signal that is a scaled version of the input value, the input being the difference between the first signal 510 and the second signal 520. The low pass filter 525 scales the input value based on the frequency of the input value. For example, the low pass filter 525 scales the input value by a scaling factor in the range [0, 1], and slower the frequency of the input value, higher is the scaling factor. For example, as the frequency of the input value gets lower, the scaling factor approaches one, and as the frequency get higher, the scaling factor approaches zero. Mathematically, the scaling factor does not reach 1 or 0; however, the scaling factor is substantially 1 up to a "corner frequency". After that frequency, the scaling factor becomes substantially zero as the frequency increases. The low pass filter 525 thus scales the computed difference between the first signal 510 and the second signal 520 based on a frequency of the difference. In one or more examples, the low pass filter 525 uses a look up table that provides a value of the scaling factor to be used based on the frequency of the difference. The scaling factor is within a predetermined range, such as [0, 1] or any other range.

In one or more examples, the offset 515 is calculated by scaling the difference, for example, by a predetermined constant scalar value, such as 0.5. The offset 515 is subtracted from the first signal 510 and the difference is output as the signal-Arb 530.

Calculating the offset 515 in improves the motor control system 100 by producing consistent signals from both controllers. Further, the EPS system may use slower communication of signals between controllers, and slower calculation of the offset. Further yet, the arbitration facilitates minimizing the lag introduced into signals.

Figure 6:
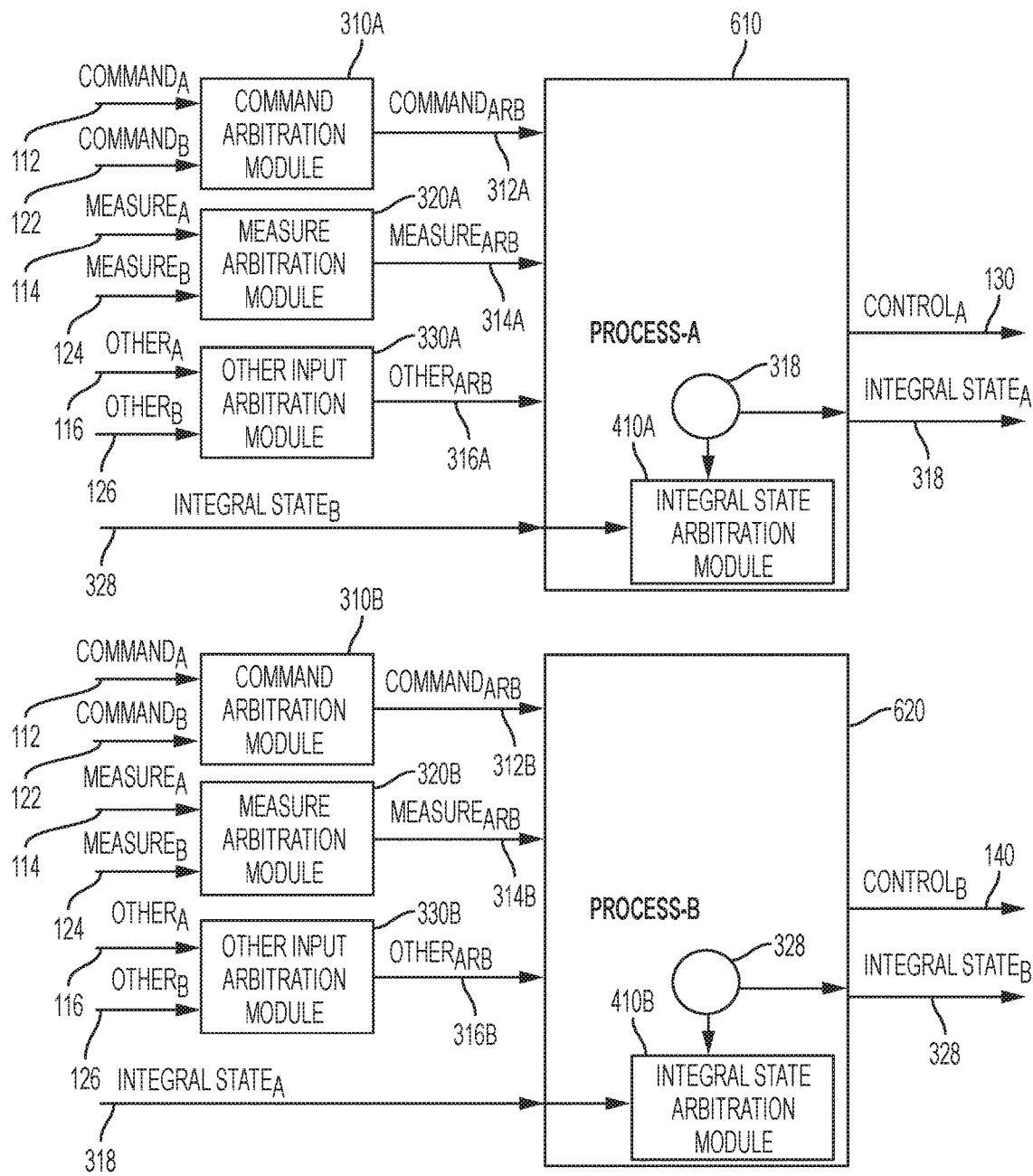
FIG. 6 depicts a motor control system according to one or more embodiments.

FIG. 6 depicts the motor control system 100 according to one or more embodiments. In the embodiments depicted by FIG. 6, the arbitration is independently performed for each of the input signals and the integral states of the two controllers. Each controller has a corresponding set of arbitration modules that arbitrate corresponding signals/computation states. For example, the controller-A 110 has a corresponding set of command arbitration module 310A, a measure arbitration module 310A, an other input arbitration module 330A, and an integral state arbitration module 410A; and the controller-B 120 has a corresponding set of command arbitration module 310B, a measure arbitration module 310B, an other input arbitration module 330B, and an integral state arbitration module 410B. The arbitration modules each generate corresponding arbitration signals, used by the controllers to generate the output. For example, the command arbitration module 310A generates an arbitrated command-Arb 312A, and the command arbitration module 310B generates an arbitrated command-Arb 312B. Similarly, corresponding arbitration modules generate the arbitrated signals measure-Arb 314A-B, and the other-Arb 316A-B. Further yet, the integral state arbitration modules 410A and 410B generate corresponding arbitrated integral states using the integral state-A 318 and the integral state-B 328. The process-A 610 and the process-B 620 are the processes 210 and 220 depicted in FIG. 3, without the arbitration and closed-loop control elements in this case (which are shown in FIG. 3).

Figure 7:
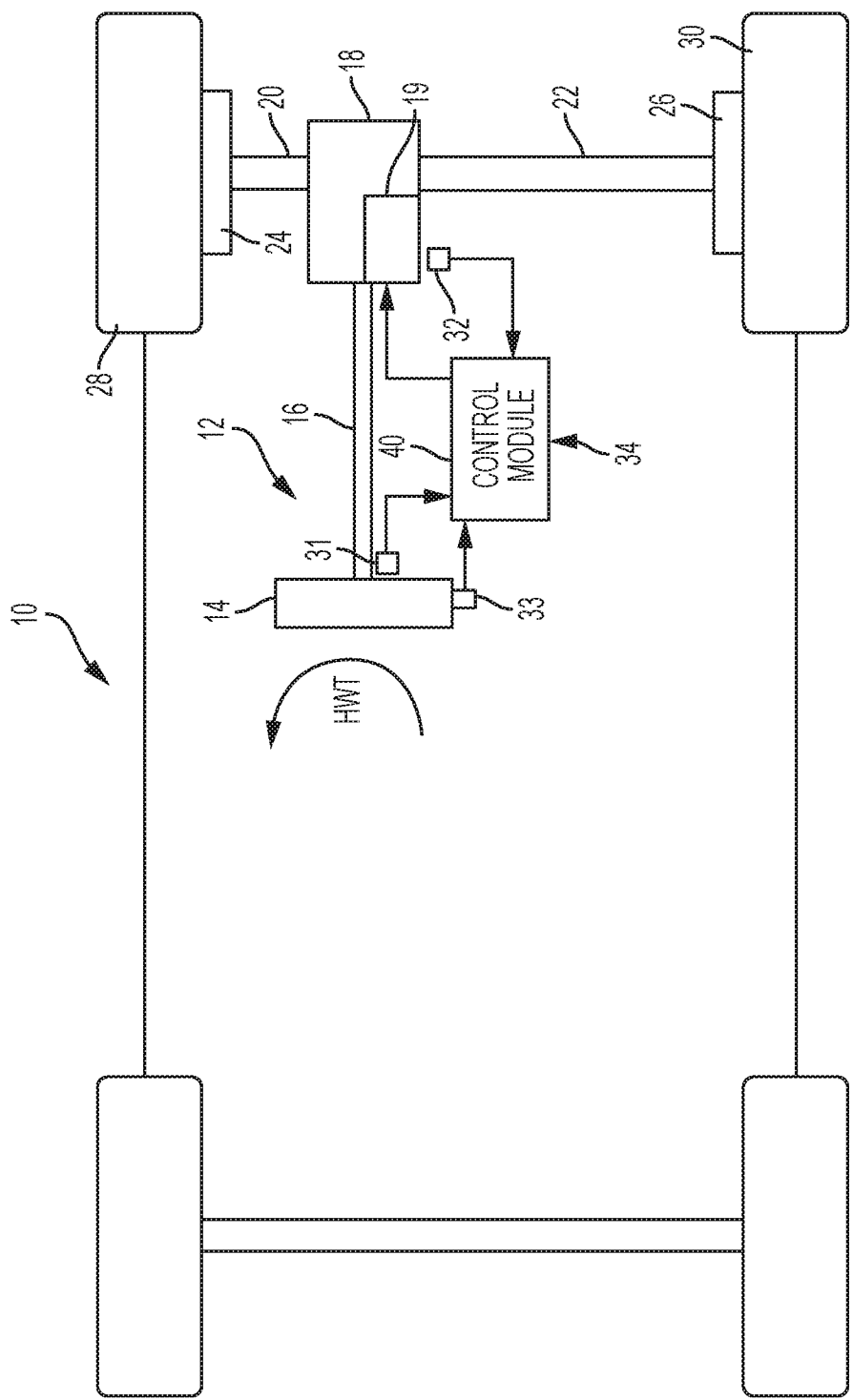
FIG. 7 depicts a vehicle including a steering system according to one or more embodiments.

Referring now to the FIG. 7 an exemplary embodiment of a vehicle 10 including a steering system 12 is depicted according to one or more embodiments. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 7, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning as a control signal that can be used to control aspects of the steering system 12 through the steering assist unit 18.

The motor control system 100 may be part of the steering system 12, for example as being implemented by the steering assist unit 18, the control module 40, or any other module.

The technical solutions described herein provide an architecture of arbitrating inputs and an integrator state for a closed-loop system control in EPS systems, which use multiple controllers. The technical solutions further facilitate arbitration of the input signals to the multiple controllers to maintain consistent signals while minimizing a lag between the input signals. Arbitration schemes, such as averaging, weighted averaging, pass-through, and the like are used for the input signals and the integrator states of the multiple controllers in the motor control system. The arbitration facilitates calculating an offset in a relatively slow process.

The technical solutions described herein facilitate improving reliability of an electrical power steering system that uses two or more controllers and a closed loop integral action for redundancy purposes. The technical solutions described herein facilitate producing consistent signals that are input to the multiple controllers, and arbitrating intermediate computation values, such as an integral state between the multiple controllers, thus facilitating consistent outputs from the controllers. The technical solutions facilitate such results at costs lower than typical approaches, by using slower communication of signals between the controllers and a slower calculation of offset. An example method includes arbitrating the input signals and an integrator state for the closed loop integral action. Further, the technical solutions facilitate minimizing lag introduced into the input signals due to arbitration.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of" <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions has been described in detail in connection with only a limited number of examples, it should be readily understood that the technical solutions is not limited to such disclosed examples. Rather, the technical solutions can be modified to incorporate any number of variations, alterations, substitutions or equivalent arrangements not heretofore described, but which are commensurate with the spirit and scope of the technical solutions. Additionally, while various examples of the technical solutions have been described, it is to be understood that aspects of the technical solutions may include only some of the described examples. Accordingly, the technical solutions is not to be seen as limited by the foregoing description.

What is claimed is:

1. A motor control system comprising:
   a first controller;
   a second controller;
   a first arbitration module associated with the first controller, the first arbitration module configured to generate a first arbitrated input signal based on a first input signal directed to the first controller, and a second input signal directed to the second controller, the first arbitrated input signal used by the first controller to generate a first control output; and
   a second arbitration module associated with the second controller, the second arbitration module configured to generate a second arbitrated input signal based on the first input signal directed to the first controller, and the second input signal directed to the second controller, the second arbitrated input signal used by the second controller to generate a second control output, wherein the first arbitration module computes the first arbitration signal by subtracting an offset from the first input signal, and the offset is computed based on a difference between the first input signal and the second input signal.

2. The motor control system of claim 1, further comprising:
   a first motor configured to generate a first torque in response to receiving the first control output; and
   a second motor configured to generate a second torque in response to receiving the second control output.

3. The motor control system of claim 2, wherein the first torque and the second torque are applied to a shaft being operated by the first motor and the second motor.

4. The motor control system of claim 1, wherein the first input signal is a first command directed to the first controller and the second input signal is a second command directed to the second controller.

5. The motor control system of claim 1, wherein the first input signal is a first measurement directed to the first controller, and the second input signal is a second measurement directed to the second controller.

6. The motor control system of claim 5, wherein the first measurement is received from a first sensor that is part of a first closed-loop system of the first controller, and the second measurement is received from a second sensor that is part of a second closed-loop system of the second controller.

7. The motor control system of claim 5, wherein the first measurement is measured by a sensor at a first time-point and the second measurement is measured by the sensor at a second time-point.

8. The motor control system of claim 1, wherein the first input signal is an integral state of the first controller and the second input signal is an integral state of the second controller.

9. The motor control system of claim 1, wherein the first arbitration module is further configured to minimize a value of the offset for differences that change at frequencies above a predetermined threshold by scaling the offset based on the frequency of the offset, prior to subtracting the offset from the first input signal.

10. The motor control system of claim 1, wherein the second arbitration module subtracts an offset from the second input signal, the offset computed based on a difference between the second input signal and the first input signal.

11. A method for operating a motor control system that includes two or more controllers, the method comprising:
computing, by a first arbitration module associated with a first controller, a first arbitrated input signal based on a first input signal directed to the first controller, and a second input signal directed to a second controller;
generating, by the first controller, a first control output using the first arbitrated input signal;
computing, by a second arbitration module associated with the second controller, a second arbitrated input signal based on the first input signal directed to the first controller, and the second input signal directed to the second controller, wherein the first arbitration signal is computed by subtracting an offset from the first input signal, and the offset is computed based on a difference between the first input signal and the second input signal; and
generating, by the second controller, a second control output using the second arbitrated input signal.

12. The method of claim 11, wherein the first input signal is a first command directed to the first controller and the second input signal is a second command directed to the second controller.

13. The method of claim 11, wherein the first input signal is a first measurement directed to the first controller, and the second input signal is a second measurement directed to the second controller, and wherein the first measurement is received from a first sensor that is part of a first closed-loop system of the first controller, and the second measurement is received from a second sensor that is part of a second closed-loop system of the second controller.

14. The method of claim 11, wherein the first input signal is a first measurement directed to the first controller, and the second input signal is a second measurement directed to the second controller, and wherein the first measurement is measured by a sensor at a first time-point and the second measurement is measured by the sensor at a second time-point.

15. The method of claim 11, wherein the first input signal is an integral state of the first controller and the second input signal is an integral state of the second controller.

16. The method of claim 11, wherein:
computing the second arbitrated signal comprises subtracting a second offset from the second input signal, the second offset computed by subtracting the first input signal from the second input signal.

17. An electric power steering system comprising:
a first motor configured to generate a first assist torque;
a second motor configured to generate a second assist torque;
a first controller to generate a first control output for the first motor using a closed-loop control loop to generate the first assist torque;
a second controller to generate a second control output for the second motor using a closed-loop control loop to generate the second assist torque;
a first arbitration module associated with the first controller, the first arbitration module configured to generate a first arbitrated input signal based on a first input signal directed to the first controller, and a second input signal directed to the second controller, the first arbitrated input signal used by the first controller to generate the first control output; and
a second arbitration module associated with the second controller, the second arbitration module configured to generate a second arbitrated input signal based on the first input signal directed to the first controller, and the second input signal directed to the second controller, the second arbitrated input signal used by the second controller to generate a second control output, wherein computing the first arbitrated signal comprises subtracting a first offset from the first input signal, the first offset being computed by subtracting the second input signal from the first input signal.

18. The electric power steering system of claim 17, wherein:
the first input signal comprises at least one of a first input command to the first controller, and a measurement received by the first controller, and
the second input signal comprises at least one of a second input command to the second controller, and a measurement received by the second controller.

19. The electric power steering system of claim 17, wherein the first input signal is an integral state of the first controller and the second input signal is an integral state of the second controller.

* * * * *